United States Patent [19]
Yoon

[11] Patent Number: 5,861,923
[45] Date of Patent: Jan. 19, 1999

[54] VIDEO SIGNAL ENCODING METHOD AND APPARATUS BASED ON ADAPTIVE QUANTIZATION TECHNIQUE

[75] Inventor: Sung-Wook Yoon, Seoul, Rep. of Korea

[73] Assignee: Deawoo Electronics Co., Ltd., Seoul, Rep. of Korea

[21] Appl. No.: 839,001

[22] Filed: Apr. 23, 1997

[30] Foreign Application Priority Data

Apr. 23, 1996 [KR] Rep. of Korea ................. 96-12373

[51] Int. Cl.$^6$ ............................................. H04N 7/28
[52] U.S. Cl. ........................ 348/421; 348/420; 348/422
[58] Field of Search ............................... 348/414, 417, 348/418, 420, 421, 422; H04N 7/28

[56] References Cited

U.S. PATENT DOCUMENTS

| | | | |
|---|---|---|---|
| 5,068,723 | 11/1991 | Dixit | 248/420 |
| 5,272,529 | 12/1993 | Frederiksen | 348/422 |
| 5,377,018 | 12/1994 | Rafferty | 358/433 |
| 5,663,764 | 9/1997 | Kondo | 348/414 |
| 5,692,012 | 11/1997 | Virtamo | 348/417 |

FOREIGN PATENT DOCUMENTS 9400949  1/1994  WIPO .

Primary Examiner—Howard Britton
Attorney, Agent, or Firm—Anderson, Kill & Olick, P.C.

[57] ABSTRACT

A method and apparatus encodes primary blocks included in an image signal based on the adaptive quantization technique. First, each primary block is divided into first subblocks of M×N data elements and second subblocks of P×Q data elements, wherein P and Q are multiples of M and N. A covariance for each first subblock is then calculated and compared with a threshold TH1 to thereby determine scalar blocks and primitive vector blocks, wherein a scalar block corresponds to a first subblock having a covariance greater than TH1 and a primitive vector block corresponds to a first subblock having a covariance not greater than TH1. Thereafter, a second subblock containing only primitive vector blocks therein is set as a candidate vector block and a covariance for the candidate vector block is calculated. Finally, primitive vector blocks not included in any of the candidate vector blocks or included in a candidate vector block having a covariance not smaller than TH2 are determined as first vector blocks; and candidate vector blocks having covariances smaller than TH2 are determined as second vector blocks. Thereafter, the scalarblock is scalar-quantized to thereby generate scalar quantized data, and the first and second vector blocks are vector-quantized on a first vector block and a second vector block bases to thereby provide first and second vector quantized data, respectively.

18 Claims, 2 Drawing Sheets

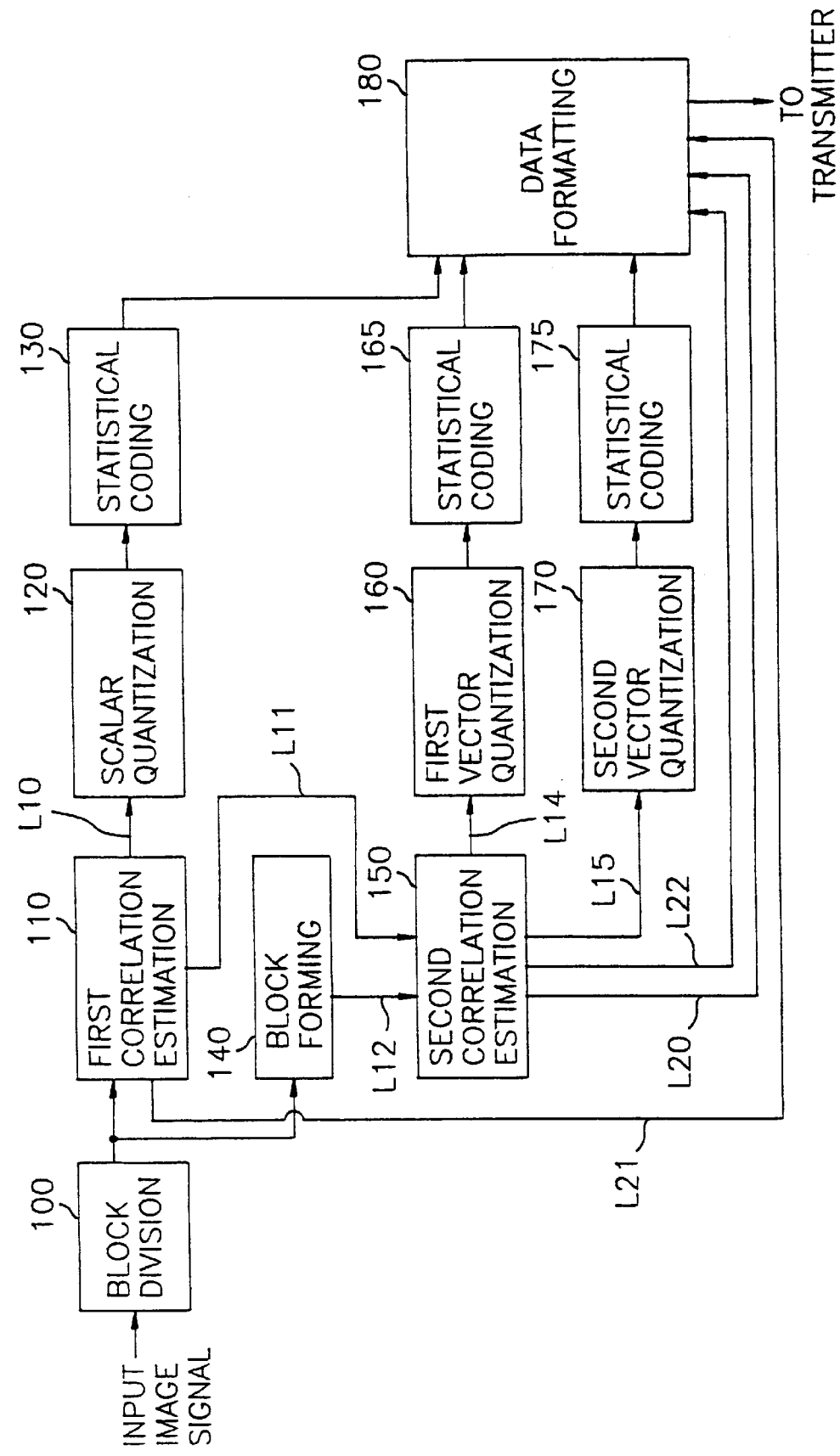

VIDEO SIGNAL ENCODING METHOD AND APPARATUS BASED ON ADAPTIVE QUANTIZATION TECHNIQUE

FIELD OF THE INVENTION

The present invention relates to a video signal encoder; and, more particularly, to a method and apparatus for encoding a digitized video signal through the use of an adaptive quantization technique.

DESCRIPTION OF THE PRIOR ART

In a digitally televised system such as video-telephone, teleconference or high definition television system, a video signal may be transmitted in a digital form. When the video signal including a sequence of image "frames" is expressed in a digital form, there occurs a substantial amount of digital data: for each line of an image frame is defined by a sequence of digital data elements referred to as "pixels". Since, however, the available frequency bandwidth of a conventional transmission channel is limited, in order to transmit the large amount of digital data therethrough, it is necessary to compress or reduce the volume of data through the use of various data compression techniques, especially, in the case of such low bit-rate video signal encoders as video-telephone and teleconference systems.

One of such data compression techniques is quantization. The quantization scheme is basically classified into scalar quantization and vector quantization. In scalar quantization, an individual input data element, e.g., a pixel value in an input image signal, is converted into a closest quantized scalar value determined based on a predetermined quantization step size. In general, the scalar quantization process is relatively simple and may produce less quantization errors than those of vector quantization. Since, however, in the scalar quantization technique, data elements in the input image signal are quantized individually and quantized output data is produced for every single input data element, the scalar quantization technique may be less effective than the vector quantization technique in terms of the coding efficiency.

Vector quantization is a technique for quantizing an input image signal in units of blocks. The input image signal is divided into blocks of M×N data elements: and each block is represented by an M×N dimensional input vector. Thereafter, each input vector is mapped into one of a set of candidate vectors (or codewords) in a codebook. An input vector is represented by a representative vector, the representative vector being a most similar candidate vector having a minimum mapping distortion, i.e., a least quantization error. Compression is achieved by using an index for each candidate vector, i.e., a codeword index, in lieu of the vector itself, for the purpose of economizing the transmission and storage burdens. The codeword index may be further compressed by using, e.g., a variable length coding (VLC) method.

In view of the data compression efficiency, vector quantization may be more effective than scalar quantization, especially in the case of highly correlated input image signals. However, in vector quantization, a large number of candidate vectors should be maintained in the codebook and the mapping process normally involves a huge amount of computational burden.

The number of candidate vectors in a codebook and the codebook contents are largely dependent on the statistical properties of the input vectors. In case that the input vectors have a wide variety, or in other words, if the data elements in input vectors are less correlated each other, the number of candidate vectors in the codebook becomes very large. In terms of the coding efficiency, a smaller codebook obviously yields a better performance provided the error generated in the quantization process remains the same. In general, however, if a smaller sized codebook is used, mapping distortions become very large, which in turn deteriorates the image quality.

SUMMARY OF THE INVENTION

It is, therefore, a primary object of the present invention to provide a video signal encoding apparatus and method employing an adaptive quantization technique capable of effectively quantizing the input image signal based on correlations of the data elements included therein.

In accordance with the present invention, there is provided a method for encoding an image signal, the image signal being divided into a plurality of primary blocks of K×L data elements, K and L being positive integers, respectively, comprising the steps of: dividing each primary block into first subblocks of M×N data elements and second subblocks of P×Q data elements, wherein K and L are multiples of P and Q, respectively, and P and Q are multiples of M and N, with M, N, P and Q being positive integers, respectively; calculating a first covariance for each first subblock and comparing the first covariance with a predetermined threshold TH1 to thereby determine scalar blocks and primitive vector blocks, wherein a scalar block corresponds to a first subblock having a first covariance greater than TH1 and a primitive vector block corresponds to a first subblock having a first covariance equal to or smaller than TH1; setting a second subblock not containing therein a scalar block as a candidate vector block and calculating a second covariance for the candidate vector block; comparing the second covariance with a preset threshold TH2 to thereby determine first vector blocks and second vector blocks, wherein each first vector block represents a primitive vector block either not included in any of the candidate vector blocks or included in a candidate vector block having a second covariance equal to or greater than the preset threshold TH2 and each second vector block denotes a candidate vector block having a second covariance smaller than the preset threshold TH2; scalar-quantizing scalar blocks to thereby provide scalar quantized data; and vector-quantizing the first and the second vector blocks on a first vector block and a second vector block bases to thereby provide first and second vector quantized data, respectively.

BRIEF DESCRIPTION OF THE DRAWINGS

The above and other objects and features of the present invention will become apparent from the following description of preferred embodiments given in conjunction with the accompanying drawings, in which:

FIG. 1 shows a block diagram of a video signal encoding apparatus in accordance with a preferred embodiment of the present invention.

DETAILED DESCRIPTION OF THE PREFERRED EMBODIMENTS

Figure 2A:
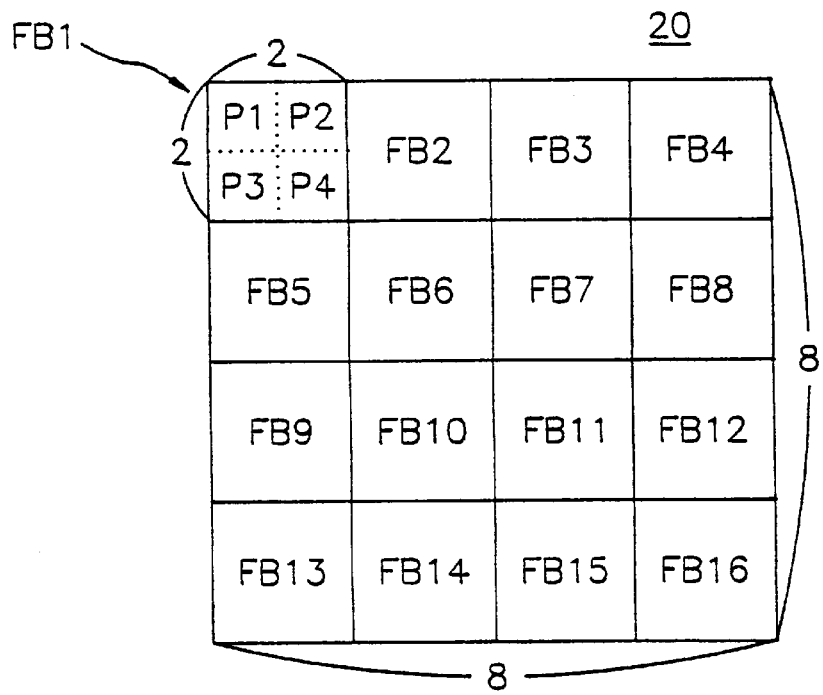
FIGS. 2A and 2B illustrating a formation of the first and the second subblocks in accordance with the present invention.

Referring to FIG. 1, there is illustrated a block diagram of a video signal encoding apparatus 10 in accordance with a preferred embodiment of the present invention. The video signal encoding apparatus 10 includes a block division circuit 100, a first and a second correlation estimation circuits 110 and 150, a block forming circuit 140, quantization circuits 120, 160 and 170, statistical coding circuits 130, 165 and 175, and a data formatting circuit 180.

An input image signal is inputted to the block division circuit 100 on a block-by-block basis, each block (will be referred to as a "primary block" hereinafter) having K×L data elements therein, with K and L being predetermined integers greater than 1, respectively. The data elements in a primary block may be either pixel values of a video signal or transform coefficients thereof obtained based on, e.g., a discrete cosine transform ("DCT").

The block division circuit 100 divides each primary block into a plurality of first subblocks of M×N data elements, wherein M and N are predetermined positive integers and K and L are multiples of M and N, respectively. The first subblocks included in a primary block are fed to the first correlation estimation circuit 110 and the block forming circuit 140. In the preferred embodiment of the present invention, it is assumed that K and L are all 8's and M and N are all 2's.

Referring to FIG. 2A, there is represented a formation of the first subblocks in accordance with the preferred embodiment, wherein a primary block 20 of 8×8 data elements includes therein first subblocks FB1 to FB16 and each of the first subblocks, e.g., FB1 has 2×2 data elements P1 to P4.

The first correlation estimation circuit 110 calculates a covariance for each first subblock and compares the covariance with a predetermined threshold TH1. The covariance $CV_1$ for a first subblock can be defined as:

$$CV_1 = \frac{1}{M \times N} \sum_{i=1}^{M} \sum_{j=1}^{N} |P_{ij} - m_1| \text{ or}$$

$$= \frac{1}{M \times N} \sum_{i=1}^{M} \sum_{j=1}^{N} (P_{ij} - m_1)^2$$

wherein $m_1$ is an average value of the data elements $P_{ij}$'s in a first subblock.

If the covariance of a first subblock is greater than TH1, the first correlation estimation circuit 110 provides, as a scalar block, the first subblock to the scalar quantization circuit 120 through a line L10 and scalar block position data to the data formatting circuit 180 via a line L21, the scalar block position data representing the position of the scalar block within the primary block. Further, the first correlation estimation circuit 110 provides an identification signal for each first subblock to the second correlation estimation circuit 150 via a line L11, wherein the identification signal indicates whether a first subblock is a scalar block or a primitive vector block, the primitive vector block representing the first subblock having a covariance equal to or smaller than TH1.

The scalar quantization circuit 120 performs the scalar quantization on a scalar block inputted thereto by using a conventional scalar quantization technique to thereby provide scalar-quantized data to the statistical coding circuit 130. At the statistical coding circuit 130, the scalar-quantized data inputted thereto are coded based on a known statistical coding technique, e.g., a variable length coding (VLC). The statistically coded data for each of the scalar blocks is then fed to the data formatting circuit 180.

In the meantime, the block forming circuit 140 receives the first subblocks within the primary block from the block division circuit 100 and divides the primary block into second subblocks of P×Q data elements, wherein P and Q are multiples of M and N and at the same time divisors of K and L, respectively. In the preferred embodiment of the present invention, it is assumed that P and Q are all 4's.

Figure 2B:
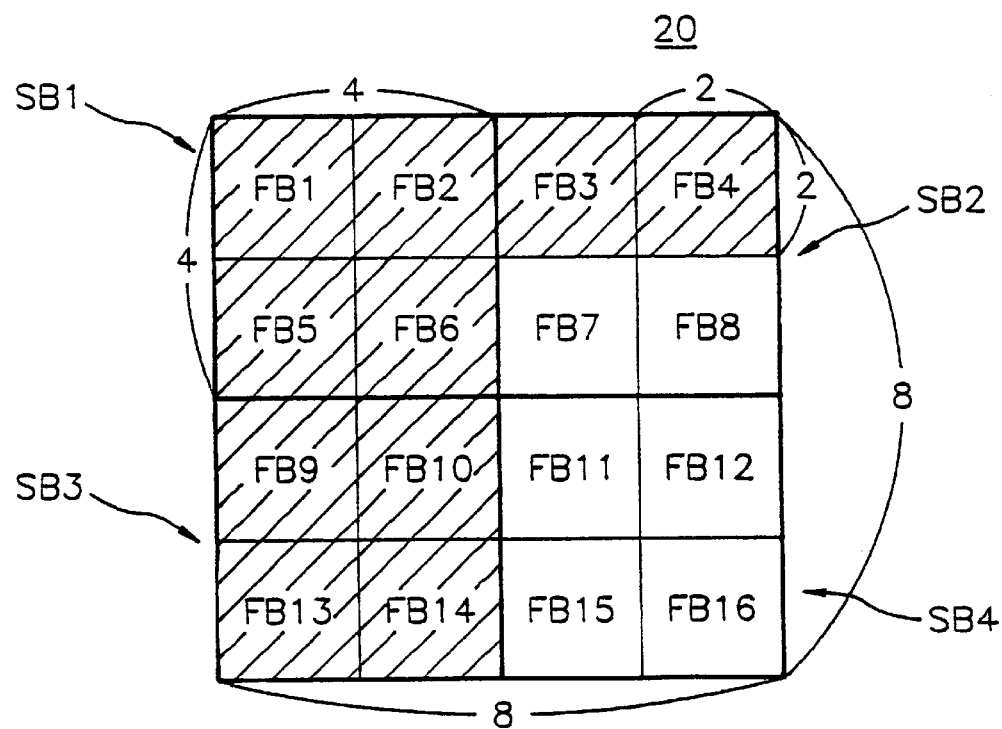

Referring to FIG. 2B, there are illustrated second subblocks SB1 to SB4, each including therein 2×2 first subblocks, e.g., FB1, FB2, FB5 and FB6. The second subblocks are then transmitted to the second correlation estimation circuit 150 via a line L12.

The second correlation estimation circuit 150 determines in response to the identification signals on the line L11 whether first subblocks within each second subblock are all primitive vector blocks. If a second subblock is found to include therein primitive vector blocks only, such second subblock is determined as a candidate vector block. On the other hand, if there is found any primitive vector block not included in a candidate vector block, such a primitive vector block is determined as a first vector block.

Thereafter, the second correlation estimation circuit 150 calculates a covariance of a candidate vector block in a similar manner as in the case of the covariance of the first subblock. The covariance $CV_2$ of a candidate vector block may be defined as:

$$CV_2 = \frac{1}{P \times Q} \sum_{k=1}^{P} \sum_{l=1}^{Q} |P_{kl} - m_2| \text{ or}$$

$$= \frac{1}{P \times Q} \sum_{k=1}^{P} \sum_{l=1}^{Q} (P_{kl} - m_2)^2$$

wherein $m_2$ is an average value of the data elements $P_{kL}$'s in a candidate vector block.

And then, the second correlation estimation circuit 150 compares the covariance $CV_2$ of each candidate vector block with a preset threshold TH2; and determines primitive vector blocks within a candidate vector block as first vector blocks if the covariance $CV_2$ for the candidate vector block is greater than TH2. If $CV_2$ is equal to or smaller than TH2, the candidate vector block is determined as a second vector block.

After determining first and second vector blocks within the each primary block, the second correlation estimation circuit 150 outputs each first vector block and its corresponding first position data to the first vector quantization circuit 160 and the data formatting circuit 180 via lines L14 and L20, respectively, the first position data representing a position of a first vector block within a primary block. Each second vector block and its corresponding second position data are also transmitted from the second correlation estimation circuit 150 to the second vector quantization circuit 170 and the data formatting circuit 180 via lines L15 and L22, respectively, the second position data indicating a position of a second vector block within a primary block.

Referring back to FIG. 2B, there is illustrated details of the vector block determination scheme in accordance with the preferred embodiment of the present invention. In FIG. 2B, it is assumed that the hatched first subblocks FB1 to FB6, FB9, FB10, FB13 and FB14 are primitive vector blocks and the unhatched first subblocks FB7, FB8, FB11, FB12, FB15 and FB16 correspond to scalar blocks. A second subblock SB2 is determined as a non-candidate vector block since the first subblocks FB7 and FB8 contained therein are scalar blocks; and, therefore, the first subblocks FB3 and FB4 are set as first vector blocks. On the other hand, the second subblocks SB1 and SB3 do not contain any scalar blocks therein and, therefore, they are determined as candidate vector blocks. Further, each of the candidate vector blocks SB1 and SB3 is decided as a second vector block if the covariance thereof is not greater than the preset threshold TH2. However, if the covariance of a candidate vector block, e.g., SB1, is greater than TH2, the primitive vector blocks FB1, FB2, FB5 and FB6 are set as the first vector blocks.

The first vector quantization circuit 160 performs an M×N dimensional vector quantization on each first vector block by using a conventional vector quantization technique to thereby provide a codeword index for each first vector block to the statistical coding circuit 165, wherein the codeword index is coded by, e.g., VLC. The statistically coded data for each first vector block is dispatched to the data formatting circuit 180. Similarly, the second vector quantization circuit 170 performs an P×Q dimensional vector quantization on each second vector block and provides a codeword index for each second vector block to the statistical coding circuit 175, which generates statistically coded data for each second vector block to the data formatting circuit 180.

At the data formatting circuit 180, the statistically coded data for the scalar, and the first and the second vector blocks within each primary block and the position data thereof on the lines L20–L22 are formatted in a predetermined manner and transmitted to a transmitter (not shown) for the transmission thereof.

In short, in accordance with the preferred embodiment of the invention, when a larger group of data elements, e.g., 4×4 pixels are highly correlated, such a group of data is quantized based on a higher, e.g., 4×4, dimensional vector quantization technique. If a correlation of the data in a larger group itself is not considerable, but a sub-group thereof maintains a high correlation among the data therein, the sub-group is processed by a vector quantization of a lower, e.g., 2×2, dimension. Further, if a correlation of the data in a sub-group is not considerable, the sub-group is scalar-quantized. As described above, by fully utilizing the advantageous high data compressibility of the vector quantization in accordance with the adaptive vector quantization technique of the invention, the input data elements can be effectively coded without having to maintain the large amount of codeword data.

While the present invention has been described with respect to the particular embodiments, it will be apparent to those skilled in the art that various changes and modifications may be made without departing from the spirit and the scope of the invention as defined in the following claims.

What is claimed is:

1. A method for encoding an image signal, the image signal being divided into a plurality of primary blocks of K×L data elements, K and L being positive integers, respectively, comprising the steps of:

(a) dividing each primary block into first subblocks of M×N data elements and second subblocks of P×Q data elements, wherein K and L are multiples of P and Q and P and Q are multiples of M and N, respectively, M, N, P and Q being positive integers;

(b) calculating a first covariance for each first subblock and comparing the first covariance with a predetermined threshold TH1 to thereby determine scalar blocks and primitive vector blocks, wherein a scalar block corresponds to a first subblock having a first covariance greater than TH1 and a primitive vector block corresponds to a first subblock having a first covariance equal to or smaller than TH1;

(c) scalar-quantizing the scalar blocks to thereby provide scalar quantized data; and (d) vector-quantizing the primitive vector blocks to thereby provide vector quantized data.

2. The method according to claim 1, further comprising, after said step (b), the steps of:

(b1) setting a second subblock not containing therein a scalar block as a candidate vector block and calculating a second covariance for the candidate vector block; and (b2) comparing the second covariance with a preset threshold TH2 to thereby determine first vector blocks and second vector blocks, wherein each first vector block represents a primitive vector block either not included in any of the candidate vector blocks or included in a candidate vector block having a second covariance equal to or greater than the preset threshold TH2 and each second vector block denotes a candidate vector block having a second covariance smaller than the preset threshold TH2.

3. The method according to claim 2, wherein said vector-quantizing step (d) includes the step of (d') vector-quantizing the first and the second vector blocks on a first vector block and a second vector block bases to thereby provide first and second vector quantized data, respectively.

4. The method according to claim 3, further comprising the step of statistically coding the scalar quantized, the first vector quantized and the second vector quantized data.

5. The method according to claim 3, wherein said data elements are either pixel values or transform coefficients thereof.

6. The method according to claim 5, wherein K and L equal to 8, P and Q equal to 4, and M and N equal to 2, respectively.

7. The method according to claim 5, wherein said first covariance is defined as:

$$CV_1 = \frac{1}{M \times N} \sum_{i=1}^{M} \sum_{j=1}^{N} |P_{ij} - m_1|$$

wherein $CV_1$ is the first covarience and $m_1$ is an average value of the data elements $P_{ij}$'s in a first subblock.

8. The method according to claim 7, wherein said second covariance is defined as:

$$CV_2 = \frac{1}{P \times Q} \sum_{k=1}^{P} \sum_{l=1}^{Q} |P_{kl} - m_2|$$

wherein $CV_2$ is the second covariance and $m_2$ is an average value of the data elements $P_{kl}$'s in a candidate vector block.

9. The method according to claim 5, wherein said first covariance is defined as:

$$CV_1 = \frac{1}{M \times N} \sum_{i=1}^{M} \sum_{j=1}^{N} (P_{ij} - m_1)^2$$

wherein $CV_1$ is the first covarience and $m_1$ is an average value of the data elements $P_{ij}$'s in a first subblock.

10. The method according to claim 9, wherein said second covariance $CV_2$ is defined as:

$$CV_2 = \frac{1}{P \times Q} \sum_{k=1}^{P} \sum_{l=1}^{Q} (P_{kl} - m_2)^2$$

wherein $CV_2$ is the second covariance and $m_2$ is an average value of the data elements $P_{kl}$'s in a candidate vector block.

11. An encoding apparatus for encoding an image signal, the image signal being divided into a plurality of primary blocks of K×L data elements, K and L being positive integers, respectively, comprising:

means for dividing each primary block into first subblocks of M×N data elements and second subblocks of P×Q data elements, wherein K and L are multiples of P and Q, respectively, and P and Q are multiples of M and N, with M, N, P and Q being positive integers, respectively;

means for calculating a first covariance for each first subblock and comparing the first covariance with a predetermined threshold TH1, wherein if a first subblock has a first covariance greater than TH1, the first subblock is set as a scalar block and if otherwise, the first subblock is set as a primitive vector block;

means for finding candidate vector blocks and calculating a second covariance for each candidate vector block, a candidate vector block representing a second subblock including therein primitive vector blocks only;

means for comparing the second covariance with a preset threshold TH2 to thereby determine first vector blocks and second vector blocks, wherein each first vector block represents either a primitive vector block not included in any of the candidate vector blocks or a primitive vector block included in a candidate vector block having a second covariance equal to or greater than the preset threshold TH2 and each second vector block denotes a candidate vector block having a second covariance smaller than the preset threshold TH2;

means for scalar-quantizing scalar blocks to thereby provide scalar quantized data; and means for vector-quantizing the first and the second vector blocks on a first vector block and a second vector block bases to thereby provide first and second vector quantized data, respectively.

12. The apparatus according to claim 11, wherein said data elements are either pixel values or transform coefficients thereof.

13. The apparatus according to claim 11, further comprising means for statistically coding the scalar quantized, the first vector quantized and the second vector quantized data.

14. The apparatus according to claim 11, wherein said first covariance and said second covariance are defined as:

$$CV_1 = \frac{1}{M \times N} \sum_{i=1}^{M} \sum_{J=1}^{N} |P_{ij} - m_1|$$

wherein $CV_1$ is the first covarience and $m_1$ is an average value of the data elements $P_{ij}$'s in a first subblock; and $$CV_2 = \frac{1}{P \times Q} \sum_{k=1}^{P} \sum_{l=1}^{Q} |P_{kl} - m_2|$$

wherein $CV_2$ is the second covarience and $m_2$ is an average value of the data elements $P_{kl}$'s in a candidate vector block.

15. The apparatus according to claim 11, wherein said first covariance and said second covariance are defined as:

$$CV_1 = \frac{1}{M \times N} \sum_{i=1}^{M} \sum_{j=1}^{N} (P_{ij} - m_1)^2$$

wherein $CV_1$ is the first covarience and $m_1$ is an average value of the data elements $P_{ij}$'s in a first subblock; and $$CV_2 = \frac{1}{P \times Q} \sum_{k=1}^{P} \sum_{l=1}^{Q} (P_{kl} - m_2)^2$$

wherein $CV_2$ is the second covariance and $m_2$ is an average value of the data elements $P_{kl}$'s in a candidate vector block.

16. The apparatus according to claim 11, wherein K, M, and P are equal to L, N, and Q, respectively.

17. The apparatus according to claim 16, wherein K and P equal to 2×P and 2×M, respectively, and K is 8.

18. The apparatus according to claim 17, wherein K is 8.

* * * * *